United States Patent
Takizuka et al.

(10) Patent No.: US 7,601,768 B2
(45) Date of Patent: Oct. 13, 2009

(54) ANTIFOGGING COATING COMPOSITION AND ARTICLE COATED THEREWITH

(75) Inventors: Norikazu Takizuka, Handa (JP); Eiji Harata, Handa (JP); Masato Sugiura, Nagoya (JP)

(73) Assignee: Nippon Oil & Fats Co. Ltd., Tokyo (JP)

( * ) Notice: Subject to any disclaimer, the term of this patent is extended or adjusted under 35 U.S.C. 154(b) by 482 days.

(21) Appl. No.: 10/484,979

(22) PCT Filed: Jul. 23, 2002

(86) PCT No.: PCT/JP02/07422

§ 371 (c)(1),
(2), (4) Date: Sep. 7, 2004

(87) PCT Pub. No.: WO03/010252

PCT Pub. Date: Feb. 6, 2003

(65) Prior Publication Data

US 2005/0004280 A1    Jan. 6, 2005

(30) Foreign Application Priority Data

Jul. 24, 2001    (JP) .............. 2001-222427

(51) Int. Cl.
C09K 3/18    (2006.01)
C08K 5/53    (2006.01)

(52) U.S. Cl. ............ 523/169; 524/115; 524/147; 524/555; 427/372.2

(58) Field of Classification Search ........... 523/169; 524/169

See application file for complete search history.

(56) References Cited

U.S. PATENT DOCUMENTS

| | | | | |
|---|---|---|---|---|
| 5,180,760 | A | * | 1/1993 | Oshibe et al. ............ 523/169 |
| 5,873,931 | A | * | 2/1999 | Scholz et al. ............ 100/13 |
| 6,214,418 | B1 | | 4/2001 | Igarashi et al. |
| 6,767,987 | B2 | | 7/2004 | Okazaki |

FOREIGN PATENT DOCUMENTS

| | | |
|---|---|---|
| EP | 0 444 864 A1 | 2/1991 |
| JP | 5-239178 | 9/1993 |
| JP | 8-012928 | 1/1996 |
| JP | 10-130613 | 5/1998 |
| JP | 11-228940 | 8/1999 |
| JP | 2000-351271 | 12/2000 |

OTHER PUBLICATIONS

Machine translation of JP 06-107967, Apr. 19, 1994.*

* cited by examiner

*Primary Examiner*—Vickey Nerangis
(74) *Attorney, Agent, or Firm*—Robert D. Buyan; Stout, Uxa, Buyan & Mullins

(57) ABSTRACT

An antifogging paint composition for forming an antifogging coating film without generation of the running water trace. The antifogging paint composition contains a block or grafted copolymer comprising a hydrophilic polymer part formed from a vinyl monomer having a cross-linking functional group and a water-soluble vinyl monomer, and a hydrophobic polymer part formed from a non water-soluble vinyl monomer, and an acidic alkyl phosphate.

11 Claims, No Drawings

ANTIFOGGING COATING COMPOSITION AND ARTICLE COATED THEREWITH

TECHNICAL FIELD

The present invention relates to an antifogging paint composition. More specifically, it relates to an antifogging paint composition for forming an antifogging coating film on the surface of a transparent plastic material or a glass material, and a coating substance with the antifogging coating film formed.

BACKGROUND ART

A conventional heat-curable antifogging agent composition using a random copolymer has an insufficient adhesion property with respect to a plastic or a glass base material. The present inventors disclosed a heat-curable antifogging agent composition with an improved adhesion property in the Japanese Laid-Open Patent Publication Nos. Hei 6-212146 and Hei 6-107967. In the case of forming a coating film with the antifogging agent composition, in order to obtain a hardened coating film with a good performance, strict process conditions of a high temperature of 120° C. or more and a hardening time of 30 minutes or more are required. Since the obtained coating film is provided with the hydrophilic property on the coating film surface by a hydrophilic polymer part in a block or grafted copolymer, and at the same time, the adhesion property with respect to the base material can be provided by a hydrophobic polymer part, it is excellent in terms of both the hydrophilic property and the adhesion property. Furthermore, since a surfactant contained in the coating film lowers the surface tension of water drops adhered on the coating film surface so as to make a water film out of the adhered water drops, the coating film has the excellent antifogging property.

Recently, for energy conservation and productivity improvement in coating equipment, lowering of the drying temperature for an antifogging agent composition and reduction in the drying time are important. Therefore, by lowering the hardening temperature of the heat-curable antifogging agent composition or by reducing the hardening time, the composition may be hardened insufficiently so that a problem arises in that the water resistance of the coating film is lowered.

By adding an acid hardening catalyst used in a heat-curable paint such as an acrylic melamine paint or an alkyd melamine paint in the heat-curable antifogging agent composition, lowering of the hardening temperature and reduction in the hardening time can be achieved. However, at the time the water film is formed on the surface of the antifogging coating film after hardening and the water runs down so as to be dried, a problem arises in terms of the external appearance in that the trace of the running water is conspicuous as pollution.

In the case where the antifogging coating film is formed on, for example, the inner surface of a meter cover or a light cover, it is difficult to wipe off the pollution of the running water trace due to the structure of the meter or the light. Therefore, an antifogging coating film without the risk of generating the running water trace is called for.

DISCLOSURE OF THE INVENTION

Accordingly, an object of the present invention is to provide an antifogging paint composition and a coating substance thereof, capable of forming an antifogging coating film to be hardened at a low temperature in a short time, having an excellent antifogging property and adhesion property without conspicuous running water trace.

To achieve the above object, the present invention provides an antifogging paint composition including a copolymer containing a hydrophilic polymer part formed from a water-soluble vinyl monomer and a cross-linkable vinyl monomer having a cross-linking functional group, and a hydrophobic polymer part formed from a non water-soluble vinyl monomer; and an acidic alkyl phosphate.

The present invention also provides a coating substance having an antifogging coating film formed by the antifogging paint composition on the surface thereof.

The present invention further provides a method for forming an antifogging coating film on a surface. The method includes preparing an antifogging paint composition containing a copolymer comprising a hydrophilic polymer part formed from a cross-linkable vinyl monomer having a cross-linking functional group and a water-soluble vinyl monomer and a hydrophobic polymer part formed from a non water-soluble vinyl monomer, and an acidic alkyl phosphate; forming a coating film by coating the antifogging paint composition on the surface; drying the coating film; and hardening the coating film.

BEST MODE FOR CARRYING OUT THE INVENTION

In this specification, (meth)acrylic denotes both acrylic and methacrylic.

An antifogging paint composition of the present invention contains an acidic alkyl phosphate (ester), and a block or grafted copolymer. First, the block or grafted copolymer will be explained. The block or grafted copolymer comprises a hydrophilic polymer part with a cross-linkable vinyl monomer having a cross-linking functional group and a water-soluble vinyl monomer, and a hydrophobic polymer part with a non water-soluble vinyl monomer.

The hydrophilic polymer part comprising the block or grafted copolymer will be explained. As the water-soluble vinyl monomer component formed in the hydrophilic polymer part, for example, nitrogen atom containing vinyl monomers such as (meth)acrylic amide, N-methyl (meth)acrylic amide, N,N-dimethyl (meth)acrylic amide, N-ethyl (meth)acrylic amide, N,N-diethyl (meth)acrylic amide, N-n-propyl (meth)acrylic amide, N-isopropyl (meth)acrylic amide, N,N'-dimethyl amino ethyl (meth)acrylic amide, N,N'-dimethyl amino propyl (meth)acrylic amide, diacetone (meth)acrylic amide, N-(meth)acryloyl piperidine, N-(meth)acryloyl morpholine, N-vinyl-2-pirrolydone, and 4-vinyl pyridine; carboxylic acid group containing vinyl monomers such as (meth)acrylic acid, itaconic acid, and crotonic acid, ammonium salts, organic amine salts and alkaline metal salts thereof; sulfonic acid group containing vinyl monomers such as styrene sulfonic acid, vinyl sulfonic acid, 2-acrylic amide-2-methyl sulfonic acid, 2-sulfoethyl (meth)acrylate, and 3-sulfopropyl (meth)acrylate, ammonium salts, organic amine salts and alkaline metal salts thereof; alkoxy alkylene glycol group containing vinyl monomers such as a methoxy polyethylene glycol (meth)acrylate (here, the number of ethylene oxides is preferably 1 to 10), and methoxy polypropylene glycol (meth)acrylate (here, the number of propylene oxides is preferably 1 to 10), or the like can be presented. One or more thereof are used.

Among these water-soluble vinyl monomers, in view of improvement of the antifogging property of the coating film, the nitrogen atom containing vinyl monomers, such as N,N-dimethyl (meth)acrylic amide, N,N'-dimethyl amino ethyl (meth)acrylic amide, N-(meth)acryloyl morpholine, and N-vinyl-2-pyrrolidone can be used preferably.

The ratio of the water-soluble vinyl monomer comprising the hydrophilic polymer part, that is, the ratio of the polymer part formed from the water-soluble vinyl monomer in the hydrophilic polymer part is preferably 70 to 99% by weight. In the case where it is less than 70% by weight, the antifogging property is lowered, and in the case it is more than 99% by weight, the water resistance of the coating film tends to be lowered due to decline of the cross-linking degree of the coating film.

The ratio of the nitrogen atom containing vinyl monomer in the water-soluble vinyl monomer is preferably 10 to 100% by weight. In the case where the ratio of the nitrogen atom containing vinyl monomer is less than 10% by weight, the antifogging property of the coating film to be obtained tends to be lowered. In order to further improve the antifogging property of the coating film, the ratio of the nitrogen atom containing vinyl monomer in the water-soluble vinyl monomer is particularly preferably 20 to 100% by weight.

The cross-linkable vinyl monomer component used for forming the hydrophilic polymer part of the block or grafted copolymer has a cross-linking functional group contributing to the following thermal condensation reaction. The thermal condensation reaction is a cross-linking reaction based on the dehydration condensation reaction between the N-methylol groups, a cross-linking reaction based on the dealcohol condensation reaction between an N-methylol group and an N-alkoxy methylol group, a cross-linking reaction based on the dehydration condensation reaction between an N-methylol group and a hydroxyl group, or a cross-linking reaction based on the dealcohol condensation reaction between an N-alkoxy methylol group and a hydroxyl group.

As the cross-linkable vinyl monomer component, for example, methylol group or alkoxy methylol group containing vinyl monomers such as N-methylol (meth)acrylic amide, N-methoxy methylol (meth)acrylic amide, and N-butoxy methylol (meth)acrylic amide; and hydroxyl group containing vinyl monomers such as 2-hydroxy ethyl (meth)acrylate, 2-hydroxy propyl (meth)acrylate, 4-hydroxy butyl (meth)acrylate, and vinyl monomer produced by adding 1 mole of ε-caprolactone to 2-hydroxy ethyl (meth)acrylate [product name: Praccel FA-1, FM-1 produced by Daicel Chemical Industries, LTD.], or the like are preferable. These can be used alone or in a combination of two or more.

N-methylol (meth)acrylic amide, N-alkoxy methylol (meth)acrylic amide, and a mixture of the same and a hydroxyl group containing vinyl monomer are particularly preferable in terms of the low temperature hardening property and the hardening time reduction.

The ratio of the vinyl monomer having a cross-linking functional group comprising the hydrophilic polymer part in the monomer, that is, the ratio of the polymer part formed from the vinyl monomer having the cross-linking functional group is preferably 1 to 30% by weight. In the case where the ratio of the vinyl monomer having the cross-linking functional group is less than 1% by weight, the water resistance of the coating film is lowered due to decline of the cross-linking degree of the obtained coating film, and in the case it is more than 30% by weight, the adhesion property of the coating film tends to be lowered.

In order to sufficiently satisfy the antifogging property, the water resistance and the adhesion property of the coating film, the ratio of the cross-linkable vinyl monomer is particularly preferably 5 to 20% by weight in the monomer comprising the hydrophilic polymer part.

For improvement of the hardness of the coating film, an ester of an alcohol having a straight chain or branched lower alkyl group and 1 to 4 carbon atoms and (meth)acrylic acid [hereinafter simply referred to as a (meth)acrylic monomer of a lower alcohol] may be contained in a monomer component comprising the hydrophilic polymer part of the block or grafted copolymer.

Specifically, for example, methyl (meth)acrylate, ethyl (meth)acrylate, n-propyl (meth)acrylate, i-propyl (meth)acrylate, n-butyl (meth)acrylate, i-butyl (meth)acrylate, t-butyl (meth)acrylate, or the like can be presented. One or more of these can be used preferably.

It is preferable that the (meth)acrylic monomers of a lower alcohol is used in a range of 50% by weight or less with respect to the water-soluble vinyl monomer. In the case where the amount is more than 50% by weight, the antifogging property of the coating film tends to be lowered.

Next, the hydrophilic polymer part of the block or grafted copolymer will be explained. As the non water-soluble vinyl monomer component comprising the hydrophobic polymer part, for example, alkyl vinyl monomers having a straight chain or branched alkyl group such as methyl (meth)acrylate, ethyl (meth)acrylate, n-propyl (meth)acrylate, i-propyl (meth)acrylate, n-butyl (meth)acrylate, i-butyl (meth)acrylate, t-butyl (meth)acrylate, 2-ethyl hexyyl (meth)acrylate, lauryl (meth)acrylate and stearyl (meth) acrylate; aromatic vinyl monomers such as styrene, vinyl toluene and α-methyl styrene; acrylonitrile, or the like can be presented. These can be used alone or in a combination of two or more.

Among these examples, the (meth)acrylic monomer of a lower alcohol is particularly preferable for improvement of the hardness of the coating film and obtainment of the adhesion property with respect to a plastic material and a glass material. As such a monomer, for example, methyl (meth)acrylate, ethyl (meth)acrylate, n-propyl (meth)acrylate, i-propyl (meth)acrylate, n-butyl (meth)acrylate, i-butyl (meth)acrylate, t-butyl (meth)acrylate, or the like can be presented.

Moreover, for providing the transparency to the coating film, a vinyl monomer having an acidic group can be contained in the non water-soluble vinyl monomer component. Specifically, (meth)acrylic acid, crotonic acid, itaconic acid, 2-sulfoethyl (meth)acrylate, 2-acrylic amide-2-methyl sulfonic acid, or the like can be presented. These can be used alone or in a combination of two or more.

The vinyl monomer having an acidic group is used preferably in a range of 30% by weight or less with respect to the non water-soluble vinyl monomer comprising the hydrophobic polymer part in the block or grafted copolymer. In the case where the vinyl monomer having an acidic group is more than 30% by weight, the adhesion property between the coating film and the base material tends to be lowered. In order to sufficiently achieve both the antifogging property of the coating film, adhesion property, and the transparency, it is particularly preferable to use the vinyl monomer having an acidic group in a range of 1 to 15% by weight with respect to the non water-soluble vinyl monomer comprising the hydrophobic polymer part in the block or grafted copolymer.

In the block or grafted copolymer, it is preferable that the weight ratio of the hydrophilic polymer part and the hydrophobic polymer part is 50/50 to 95/5 (hydrophilic polymer part/hydrophobic polymer part). In the case where the hydrophilic polymer part is less than 50% by weight, the antifogging property of the coating film is lowered, and in the case the hydrophilic polymer part is more than 95% by weight, the adhesion property with respect to the base material tends to be lowered.

Next, the production method for the block or grafted copolymer will be explained. First, the solution polymerization method for obtaining a block copolymer in an organic solvent will be explained. As to the polymerization method for the block copolymer, any of various kinds of known polymerization methods such as the radical polymerization method, the cationic polymerization method, the anionic living polymerization method and the cationic living polymerization method can be executed. Among these examples, a known polymerization method using a polymeric peroxide is preferable.

In particular, a radical polymerization method using one or more kinds of the polymeric peroxides represented by the below-mentioned formulae (1), (2), (3) as the polymerization initiator is particularly preferable in terms of efficient industrial mass production.

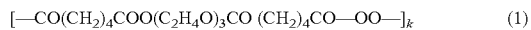  (1)

  (2)

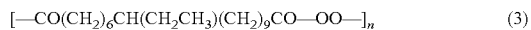  (3)

k, m, and n are integers of 2 to 20.

As the specific solution polymerization method for obtaining a block copolymer, first, an organic solvent charged in a reaction vessel equipped with a stirrer and a thermometer is heated to 60 to 80° C. Next, a polymeric peroxide and either one of a monomer formed in a hydrophilic polymer part or a monomer formed in a hydrophobic polymer part are added over 30 minutes to 3 hours. Furthermore, the polymerization reaction is carried out for 30 minutes to 3 hours so as to synthesize a block copolymer precursor. Then, with the temperature raised by 5 to 20° C., the monomer formed in the other polymer part is added over 30 minutes to 3 hours. Furthermore, the polymerization reaction is carried out for 30 minutes to 5 hours so as to obtain a block copolymer solution.

Next, the solution polymerization method for obtaining a grafted copolymer will be explained. For the polymerization method for the grafted copolymer, a known vinyl monomer having a peroxide bond can be used preferably. In particular, a radical polymerization method using a vinyl monomer having the peroxide bonds represented by the below-mentioned formulae (4) or (5) is particularly preferable in terms of efficient industrial mass production.

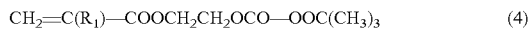  (4)

$R_1$ is hydrogen atom or methyl group.

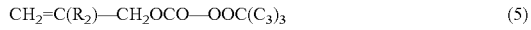  (5)

$R_2$ is hydrogen atom or methyl group.

As the specific solution polymerization method for obtaining a grafted copolymer, first, an organic solvent charged in a reaction vessel equipped with a stirrer and a thermometer is heated to 70 to 90° C. Next, a vinyl monomer having a peroxide bond, a radical polymerization initiator and either one of a monomer formed in a hydrophilic polymer part or a monomer formed in a hydrophobic polymer part are added over 30 minutes to 3 hours. Furthermore, the polymerization reaction is carried out for 30 minutes to 3 hours so as to synthesize a grafted copolymer precursor. The polymerization reaction at the time is based only on decomposition of the radical polymerization initiator so that a temperature condition setting without decomposition of the peroxide bond in the vinyl monomer having a peroxide bond is necessary. Then, with the temperature raised by 10 to 30° C., the monomer formed in the other polymer part is added over 30 minutes to 3 hours under a condition capable of decomposing the peroxide bond of the vinyl monomer having a peroxide bond. Furthermore, the polymerization reaction is carried out for 30 minutes to 5 hours so as to obtain a grafted copolymer solution.

The block or grafted copolymer comprises polymer parts with different natures of the hydrophilic polymer part and the hydrophobic polymer part. An organic solvent with the affinity with both of the polymer parts is used.

Since the adhesion property of the coating film can be deteriorated by the residual solvent in low temperature drying due to use of an organic solvent having an extremely high boiling point, it is further preferable to use an organic solvent having a boiling point of less than 180° C.

As the polymerization solvent for the block or grafted copolymer used in the present invention, for example, alcoholic solvents such as methanol, ethanol, isopropanol and diacetone alcohol; alcohol ether solvents such as ethylene glycol monomethyl ether, ethylene glycol monoethyl ether, propylene glycol monomethyl ether, propylene glycol monoethyl ether, 3-methoxy-1-butanol and 3-methoxy-3-methyl-1-butanol; ketone solvents such as methyl ethyl ketone, methyl isobutyl ketone and cyclohexanone; ether solvents such as tetrahydro furan and dioxane; ester solvents such as methyl acetate, ethyl acetate, methyl lactate and ethyl lactate, or the like can be presented. These can be used alone or in a combination of two or more.

Next, the acidic alkyl phosphate will be explained.

The acidic alkyl phosphate facilitates hardening of an antifogging paint composition at a low temperature and in a short time by improving the reactivity of the cross-linking functional group in the block or grafted copolymer. The acidic alkyl phosphate restrains generation of pollution in the hardened coating film by the running water.

As the specific examples of the acidic alkyl phosphate, a monoalkyl phosphate and a dialkyl phosphate can be presented.

Although a trialkyl phosphate can be used in a combination with an acidic alkyl phosphate, since it has barely the acidic activity as a hardening catalyst, the coating film is hardened insufficiently by use thereof alone so that the water resistance of the coating film may be extremely low.

As the monoalkyl phosphate, for example, monomethyl phosphate, monoethyl phosphate, mono n-butyl phosphate, monoisobutyl phosphate, mono 2-ethyl hexyl phosphate, monolauryl phosphate, monostearyl phosphate, or the like can be presented.

As the dialkyl phosphate, for example, dimethyl phosphate, diethyl phosphate, di-n-butyl phosphate, diisobutyl phosphate, di-2-ethyl hexyl phosphate, dilauryl phosphate, distearyl phosphate, or the like can be presented.

Among these monoalkyl phosphate and dialkyl phosphate, one or two or more can be selected and used according to the purpose. As the alkyl group of the monoalkyl phosphate and the dialkyl phosphate, those having 1 to 8 carbon atoms are preferable. In the case where the number of carbons is more than 8, since itself becomes a wax-like solid, the handling property can be deteriorated at the time of preparing the paint or the compatibility with the block or grafted copolymer may be lowered.

As to the alkyl group, in the case the number of carbons of the alkyl is less than 4, even in the case it is eluted by the running water, since itself is liquid and amorphous, it cannot be precipitated as a crystal after dying, and thus it is not conspicuous as pollution.

Moreover, since an acidic alkyl phosphate having 4 or more carbon atoms in the alkyl group, is non water-soluble itself, it cannot be eluted by the running water so that running water pollution can hardly be generated.

In general, the monoalkyl phosphate and the dialkyl phosphate are used as a mixture so that the operation effects of both of them can be provided.

Since a monoalkenyl phosphate or a dialkenyl phosphate such as monooleyl phosphate and dioleyl phosphate has a double bond, the photo resistance of the coating film is lowered so as to be easily deteriorated by the ultraviolet ray, or the like, and thus it is not preferable.

The amount of the acidic alkyl phosphate is 0.01 to 3% by weight, preferably 0.1 to 1.5% by weight with respect to the block or grafted copolymer in terms of the balance of the coating film balance.

In the case where the amount of the acidic alkyl phosphate is less than 0.01% by weight, the hardening property at a low temperature is insufficient so that the water resistance is lowered. In the case where it is more than 3% by weight, the running water pollution may be generated or the hardened coating film may be yellowed.

Moreover, since the paint may sometimes be thickened as time passes by in the case the acidic alkyl phosphate is added preliminarily, it is preferable to add the acidic alkyl phosphate immediately before coating in terms of the pot life of the paint.

Next, the surfactant will be explained. For the antifogging paint composition of the present invention, all of the known surfactants can be used, and one or more surfactants selected from a nonionic surfactant, an anionic surfactant, a cationic surfactant and an amphoteric surfactant can be used.

As the nonionic surfactant, for example, a polyoxyethylene higher alcohol esters such as polyoxyethylene lauryl alcohol, polyoxyethylene lauryl ether and polyoxyethylene oleyl ether; polyoxyethylene alkyl aryl ethers such as polyoxyethylene octyl phenyl ether and polyoxyethylene nonyl phenyl ether; polyoxyethylene acyl esters such as polyoxyethylene glycol monostearate; polypropylene glycol ethylene oxide adduct; polyoxyethylene sorbitan aliphatic esters such as polyoxyethylene sorbitan monolaurate and polyoxyethylene sorbitan monostearate; polyoxyethylene alkyl ether phosphate ester; cellulose ester, or the like can be used.

As the anionic surfactant, for example, fatty acid salts such as sodium oleate and potassium oleate; higher alcohol sulfates such as sodium lauryl sulfate and ammonium lauryl sulfate; alkyl benzene sulfonates and alkyl naphthalene sulfonates such as sodium dodecyl benzene sulfonate and sodium alkyl naphthalene sulfonate; dialkyl sulfo succinic acid salt; dialkyl phosphate salt; polyoxyethylene sulfate salts such as sodium polyoxyethylene alkyl phenyl ether sulfate, or the like can be used.

As the cationic surfactant, for example, amine salts such as ethanol amines, lauryl amine acetate, triethanol amine monoformate and stearamide ethyl diethyl amine acetate; quaternary ammonium salts such as lauryl trimethyl ammonium chloride, stearyl trimethyl ammonium chloride, dilauryl dimethyl ammonium chloride, distearyl dimethyl ammonium chloride, lauryl dimethyl benzyl ammonium chloride and stearyl dimethyl benzyl ammonium chloride, or the like can be used.

As the amphoteric surfactant, for example, fatty acid type amphoteric surfactants such as dimethyl alkyl lauryl betaine and dimethyl alkyl stearyl betaine; sulfonic acid type amphoteric surfactants such as dimethyl alkyl sulfobetaine; an alkyl glycine, or the like can be used.

The surfactants can be used alone or in a combination of two or more.

Among these surfactants, the nonionic surfactant, the anionic surfactant and the cationic surfactant are preferable for the excellent antifogging property. Among these, the anionic surfactant is preferable for the best antifogging property. Moreover, among the cationic surfactants, those having a weak basic property, specifically, a 9 or less pH in the aqueous solution are preferable since the nature as an acid of an acidic alkyl phosphate can hardly be lost so that the low temperature hardening property cannot be damaged.

Since a large number of anionic surfactants are crystalline so that the hardened coating film becomes opaque in the case the anionic surfactant is segregated in the hardened coating film, it is preferable to prevent opaqueness of the hardened coating film by using a nonionic surfactant with the anionic surfactant for inhibiting the crystal property of the anionic surfactant.

The amount of the surfactant is preferably 0.1 to 20% by weight with respect to the block or grafted copolymer. In the case where the amount of the surfactant is less than 0.1% by weight, the antifogging property is insufficient. In the case where the amount is more than 20% by weight, the water resistance of the coating film and the coating film hardness may be lowered. In view of the balance of the coating film performance, the weight ratio of the block or grafted copolymer and the surfactant (block or grafted copolymer/surfactant) is particularly preferably 100/0.5 to 100/15.

In the case where an antifogging paint composition of the present invention comprises the block or grafted copolymer, the surfactant and the acidic alkyl phosphate, the weight ratio of the components (block or grafted copolymer/surfactant/acidic alkyl phosphate) is preferably 100/0 to 20/0.01 to 3. Furthermore, from the viewpoint of the balance of the coating film performance, the weight ratio is particularly preferably 100/0.5 to 15/0.1 to 1.5.

For improving the coating film strength, the antifogging paint composition of the present invention may contain a known hardening agent. For example, melamine hardening agents as a partially methoxy or butoxy methylol melamine condensed product such as hexamethoxy methylol melamine and mexabutoxy methylol melamine; isocyanate hardening agents as a condensed product such as hexamethylene diisocyanate, toluene diisocyante and isophorone diisocyante, or the like can be used preferably.

It is preferable that the hardening agents are used by 20% by weight or less with respect to the block or grafted copolymer. In the case where it is more than 20% by weight, the antifogging property of the obtained coating film is lowered, and thus it is not preferable.

In the antifogging paint composition of the present invention, as needed, commonly used additives such as a leveling agent, an antifoaming agent, an ultraviolet ray absorbing agent, a photo stabilizing agent, an antioxidant, an anti mildew agent and an anti-bacteria agent, and coloring agents not to ruin the transparency of the coating film, such as a pigment and a dye can be included.

The antifogging paint composition of the present invention can be provided for coating as it is, but it can be used after diluting with an organic solvent for adjustment to the viscosity suitable for coating. However, since the adhesion property of the coating film can be deteriorated by the residual solvent in low temperature drying due to use of an organic solvent having an extremely high boiling point, it is further preferable to use an organic solvent having a boiling point of less than 180° C.

As a preferable organic solvent, for example, alcoholic solvents such as methanol, ethanol, isopropanol, n-butanol, isobutanol and diacetone alcohol; alcohol ether solvents such as ethylene glycol monomethyl ether, ethylene glycol monoethyl ether, propylene glycol monomethyl ether, propylene glycol monoethyl ether, 3-methoxy-1-butanol and 3-methoxy-3-methyl-1-butanol; ketone solvents such as methyl ethyl ketone, methyl isobutyl keton and cyclohexanone; ester solvents such as methyl acetate, ethyl acetate, methyl lactate and ethyl lactate, or the like can be presented. These can be used alone or in a combination of two or more.

The coating film forming method will be explained. First, according to a coating method adopted for an ordinary paint, an antifogging paint composition of the present invention is coated on a substance to be coated. For evaporating the organic solvent in the composition, the coated composition (coating film) is dried at 30 to 50° C. for 1 to 5 minutes. Next, the coating film is heated at 75 to 130° C. for 5 to 20 minutes so as to be hardened. Thereby, a hardened antifogging coating film is formed on the surface of the substance to be coated.

In the case where the substance to be coated is a plastic material, the hardening temperature is set at the thermal deformation temperature of the plastic material or less.

As the substance to be coated, a glass material, an acrylic resin, a polycarbonate resin, a plastic material such as polyethylene terephthalate, a film, a plate, a molded product and a processed product of these materials are preferable.

For improving the wetting of the antifogging paint composition with respect to the substance to be coated and preventing repellence, it is preferable to eliminate the foreign substances adhered on the surface of the substance to be coated before coating, degrease and wash. Specifically, elimination of dusts by high pressure air or ionized air, an ultrasonic washing method with an aqueous solution of a detergent or an alcohol solvent, a wiping method using an alcohol solvent, or the like, a washing method for the surface of the substance to be coated with an ultraviolet ray and ozone, or the like are preferable.

As the coating method, soaking method, flow coating method, roll coater method, bar coater method, spray coating method, or the like are preferable. The film thickness of the coating film to be formed is preferably in a range of 0.5 to 20 μm, and particularly preferably in a range of 1 to 5 μm for obtaining a further preferable coating film external appearance.

An antifogging coating film can be formed on the surface of the substance to be coated by heating and hardening the antifogging paint composition after coating the antifogging coating composition on the surface of the surface to be coated. At this time, the cross-linking functional group of the antifogging paint composition such as an N-methylol group and an N-alkoxy methylol group carries out the cross-linking reaction. The acidic alkyl phosphate activates (catalytic promotion) the cross-linking reaction based on the following reaction.

—NCH$_2$OH+H$^+$→—NCH$_2^+$+H$_2$O

—NCH$_2^-$+—NCH$_2$OH →—NCH$_2$OCH$_2$N—+H$^+$ or

—NCH$_2$OCH$_3$+H$^+$→—NCH$_2^+$+CH$_3$OH

—NCH$_2^+$+—NCH$_2$OH →—NCH$_2$OCH$_2$N—+H$^+$

The effects achieved by the above-mentioned embodiment will be described hereafter.

The antifogging paint composition of this embodiment includes the acidic alkyl phosphate in the block or grafted copolymer comprising the above-mentioned specific hydrophilic polymer part and hydrophobic polymer part. Therefore, it can be hardened at a low temperature in a short time so that a coating film having an excellent antifogging property, adhesion property and water resistance can be formed without generation of pollution. Accordingly, it can contribute to energy conservation and the high productivity by lowering of the drying temperature and reduction in the drying time.

By coating the antifogging paint composition on the substance to be coated, and heating and hardening, a coating substance with an excellent antifogging performance can be obtained. The antifogging paint composition can be used preferably for the substance to be coated in particular for the inner surface of a structure made from a plastic material or a glass material.

In the case where the water soluble vinyl monomer is a nitrogen atom containing vinyl monomer, the antifogging property of the coating film can be improved.

In the case where the cross-linking functional group of the cross-linkable vinyl monomer is an N-methylol group or an N-alkoxy methylol group, the low temperature hardening property and reduction in the hardening time can be achieved.

Since the amount of the acidic alkyl phosphate is 0.01 to 3% by weight with respect to the block or grafted copolymer, the balance of the coating film performance can be maintained preferably.

Furthermore, by containing the surfactant, the antifogging property of the coating film can further be improved.

EXAMPLES

Hereinafter, the present invention will be explained in further details with reference to the reference examples, the production examples, the examples and the comparative examples. Hereinafter, % denotes % by weight.

Reference Example 1

Production of The Block Copolymer A

In a reaction vessel equipped with a thermometer and a stirrer, 550 g of propylene glycol monoethyl ether was charged as an organic solvent. While blowing nitrogen gas therein, the reaction vessel was heated to 70° C. Into the reaction vessel, a liquid mixture with 5 g of polymeric peroxide as a polymerization initiator represented by the below-mentioned formula (6), 135 g of N,N-dimethyl acrylic amide as a water-soluble vinyl monomer and 15 g of N-methylol acrylic amide as a cross-linkable vinyl monomer dissolved was dropped over 2 hours. Thereafter, the polymerization reaction was carried out for further 2 hours so as to synthesize a block copolymer precursor.

Then, a liquid mixture of 140 g of methyl methacrylate as a non water-soluble vinyl monomer and 10 g of acrylic acid was dropped into the reaction vessel over 1 hour. By carrying out the polymerization reaction at 80° C. over 3 hours, a block copolymer A was obtained.

The block copolymer A had 100% polymer conversion ratio of the charged monomer, 35.5% solid component, 50/50 weight ratio of the hydrophilic polymer part and the hydrophobic polymer part, 100% weight ratio of the nitrogen atom containing vinyl monomer in the hydrophilic polymer part, and 10% weight ratio of the cross-linkable vinyl monomer in the hydrophilic polymer part.

[—CO (CH$_2$)$_4$COO(C$_2$H$_4$O)$_3$CO(CH$_2$)$_4$CO—OO—]$_{10}$     (6)

Reference Example 2

Production of the Block Copolymer B

In a reaction vessel equipped with a thermometer and a stirrer, 550 g of propylene glycol monoethyl ether was charged as an organic solvent. While blowing nitrogen gas therein, the reaction vessel was heated to 70° C. Into the reaction vessel, a liquid mixture with 5 g of polymeric peroxide as a polymerization initiator, 90 g of methoxy diethylene glycol methacrylate as a water-soluble vinyl monomer and 10 g of N-methylol acrylic amide, 20 g of 2-hydroxy ethyl methacrylate and 30 g of methyl methacrylate as a cross-linkable vinyl monomer dissolved was dropped over 2 hours. Thereafter, the polymerization reaction was carried out for further 2 hours so as to synthesize a block copolymer precursor.

Then, a liquid mixture of 140 g of methyl methacrylate as a non water-soluble vinyl monomer and 10 g of acrylic acid was dropped over 1 hour. By carrying out the polymerization reaction at 80° C. over 3 hours, a block copolymer B was obtained.

The block copolymer B had 100% polymer conversion ratio of the charged monomer, 35.7% solid component, 50/50 weight ratio of the hydrophilic polymer part and the hydrophobic polymer part, 6.7% weight ratio of the nitrogen atom containing vinyl monomer in the hydrophilic polymer part, and 20% weight ratio of the cross-linkable vinyl monomer in the hydrophilic polymer part.

Reference Example 3

Production of the Grafted Copolymer

In a reaction vessel equipped with a thermometer and a stirrer, 500 g of propylene glycol monomethyl ether as an organic solvent was charged. While blowing nitrogen gas therein, the reaction vessel was heated to 85° C. Into the reaction vessel, a liquid mixture with 1 g of t-butyl peroxyoctanoate and 4 g of a vinyl monomer having a peroxide bond represented by the below-mentioned formula (7) as a polymerization initiator, 63 g of N-acryloyl morpholine and 25 g of methoxy diethylene glycol methacrylate as a water-soluble vinyl monomer, 28 g of 2-hydroxy ethyl methacrylate and 15 g of N-methylol acrylic amide as a cross-linkable vinyl monomer and 16 g of methyl methacrylate dissolved was dropped over 2 hours. Thereafter, the polymerization reaction was carried out for further 2 hours so as to synthesize a grafted copolymer precursor.

Then, a liquid mixture of 57 g of methyl methacrylate as a non water-soluble vinyl monomer and 6 g of acrylic acid was dropped into the reaction vessel over 1 hour. By carrying out the polymerization reaction at 110° C. over 5 hours, a grafted copolymer was obtained.

The grated copolymer had 100% polymer conversion ratio of the charged monomer, 30% solid component, 70/30 weight ratio of the hydrophilic polymer part and the hydrophobic polymer part, 53.1% weight ratio of the nitrogen atom containing vinyl monomer in the hydrophilic polymer part, and 29.3% weight ratio of the cross-linkable vinyl monomer in the hydrophilic polymer part.

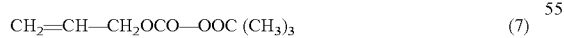

$$CH_2=CH-CH_2OCO-OOC(CH_3)_3 \quad (7)$$

Reference Example 4

Production of the Random Copolymer

In a reaction vessel equipped with a thermometer and a stirrer, 500 g of propylene glycol monomethyl ether was charged in as an organic solvent. While blowing nitrogen gas therein, the reaction vessel was heated to 100° C. Thereto, a liquid mixture with 145 g of N,N-dimethyl acrylic amide as a water-soluble vinyl monomer, 15 g of N-methylol acrylic amide and 140 g of methyl methacrylate as a cross-linkable vinyl monomer and 6 g of t-butyl peroxyoctanoate as a polymerization initiator dissolved was dropped over 2 hours.

Thereafter, the polymerization reaction was carried out for further 2 hours so as to synthesize a random copolymer. The random copolymer had 100% polymer conversion ratio of the charged monomer, and 38% solid component.

Example 1

Production of the Antifogging Paint Composition

An antifogging paint composition was obtained by mixing 140 g of a block copolymer A (solution) obtained in the reference example 1, 2 g of sodium dioctyl sulfosuccinate (produced by NOF corporation, product name: Rapizol A-80), 0.5 g of polyoxyethylene octyl phenyl ether (produced by NOF corporation, product name: Nonion HS-210), and diiso-butyl phosphate as a surfactant, and a silicon additive (produced by Toray Silicone Corp., product name: SH28PA) as a leveling agent.

The composition ratio in the solid component of the antifogging paint composition (weight part, block copolymer/surfactant/acidic alkyl phosphate) was 100/5/0.1.

Examples 2 to 5 and Comparative Examples 1 to 4

Production of the Antifogging Paint Composition

Antifogging paint composition of the examples 2 to 4 and comparative examples 1 to 4 were produced according to the method shown in the example 1 except that the kind and the amount of the materials were changed. The kind and the amount of the materials of the antifogging paint compositions, and the production results are shown in the tables 1 and 2.

TABLE 1

| | | Example | | | | |
|---|---|---|---|---|---|---|
| | | 1 | 2 | 3 | 4 | 5 |
| Block copolymer A (g) | | 140 | 140 | 0 | 0 | 140 |
| Block copolymer B (g) | | 0 | 0 | 0 | 140 | 0 |
| Grafted copolymer (g) | | 0 | 0 | 165 | 0 | 0 |
| Random copolymer (g) | | 0 | 0 | — | 0 | 0 |
| Surfactant | a | 2 | 4 | 5.4 | 2 | 0 |
| (g) | b | 0.5 | 1 | 1.5 | 0.5 | 0 |
| Acidic hardening | I | 0.05 | 0 | 0 | 0.2 | 0 |
| catalyst | II | 0 | 0.7 | 0.5 | 0 | 0 |
| (g) | III | 0 | 0 | 0 | 0 | 1.25 |
| | IV | 0 | 0 | 0 | 0 | 0 |
| | V | 0 | 0 | 0 | 0 | 0 |
| | VI | 0 | 0 | 0 | 0 | 0 |
| Leveling agent (g) | | 0.1 | 0.1 | 0.1 | 0.1 | 0.1 |
| Composition | Copolymer | 100 | 100 | 100 | 100 | 100 |
| ratio (wt %) | Surfactant | 5 | 10 | 14 | 5 | 0 |
| | Acidic hardening catalyst | 0.1 | 1.4 | 1 | 0.4 | 2.5 |

TABLE 2

| | Comparative Examples | | | |
|---|---|---|---|---|
| | 1 | 2 | 3 | 4 |
| Block copolymer A (g) | 0 | 140 | 0 | 140 |
| Block copolymer B (g) | 0 | 0 | 0 | 0 |
| Grafted copolymer (g) | 0 | 0 | 165 | 0 |

TABLE 2-continued

|  |  | Comparative Examples | | | |
|---|---|---|---|---|---|
|  |  | 1 | 2 | 3 | 4 |
| Random copolymer(g) | | 130 | 0 | 0 | 0 |
| Surfactant (g) | a | 2 | 3 | 4 | 0 |
|  | b | 0.5 | 0.5 | 1 | 0 |
| Acidic hardening catalyst (g) | I | 0.05 | 0 | 0 | 0 |
|  | II | 0 | 0 | 0 | 0 |
|  | III | 0 | 0 | 0 | 0 |
|  | IV | 0 | 0 | 0 | 0.75 |
|  | V | 0 | 0.3 | 0 | 0 |
|  | VI | 0 | 0 | 0.5 | 0 |
| Leveling agent g) | | 0.1 | 0.1 | 0.1 | 0.1 |
| Composition ratio (wt %) | Copolymer | 100 | 100 | 100 | 100 |
|  | Surfactant | 5 | 7 | 10 | 0 |
|  | Acidic hardening catalyst | 0.1 | 0.6 | 1 | 1.5 |

Surfactant . . .
a: sodium dioctyl sulfosuccinate (product name: Rapizol A-80, produced by NOF corporation)
b: polyoxyethylene octyl phenyl ether (product name: Nonion HS-210, produced by NOF corporation)
Acidic hardening catalyst . . .
I: diiso-butyl phosphate
II: mono-2-ethyl hexyl phosphate
III: dimethyl phosphate
IV: n-butyl phosphate
V: p-toluene sulfonic acid hydrate
VI: dodecyl benzene sulfonic acid
Leveling agent . . . silicone (product name: SH28PA, produced by Toray Silicone Corp.)

Examples 6 to 10 and Comparative Examples 5 to 8

Propylene glycol monomethyl ether was added as a solvent to the antifogging paint compositions obtained in the examples 1 to 5 and comparative examples 1 to 4, and the viscosity was adjusted at 20° C. so as to have 15 seconds by a viscometer Ford Cup #4. Furthermore, a coating operation was executed on various kinds of base materials by spray coating so as to have 3 to 4 μm dry film thickness. After drying operation at 40° C. for 1 minute, heating and hardening operation was executed in each condition. The coating film performance of the coating films accordingly obtained was evaluated by the following evaluation method. Results are shown in the tables 3 and 4.

TABLE 3

|  | Examples | | | | |
|---|---|---|---|---|---|
|  | 6 | 7 | 8 | 9 | 10 |
| Antifogging paint | Example 1 | Example 2 | Example 3 | Example 4 | Example 5 |
| Kind of the base material | PC | AC | GL | PC | PC |
| Hardening condition | 125° C. 5 min | 75° C. 20 min | 100° C. 10 min | 125° C. 5 min | 125° C. 5 min |
| Breath antifogging property | ○ | ○ | ○ | ○ | ○ |
| Steam antifogging property 1 hr | ◎ | ◎ | ◎ | ◎ | ○ |
| 8 hrs | ◎ | ◎ | ◎ | ○ | ○ |
| Adhesion property | ○ | ○ | ○ | ○ | ○ |
| Water resistance | ○ | ○ | ○ | ○ | ○ |
| Running water pollution | ○ | ○ | ○ | ○ | ○ |

TABLE 4

|  | Comparative Examples | | | |
|---|---|---|---|---|
|  | 5 | 6 | 7 | 8 |
| Antifogging paint | Comparative Example 1 | Comparative Example 2 | Comparative Example 3 | Comparative Example 4 |
| Kind of the base material | PC | PC | PC | PC |
| Hardening condition | 125° C. 5 min | 80° C. 15 min | 80° C. 15 min | 125° C. 10 min |
| Breath antifogging property | ○ | ○ | ○ | ○ |
| Steam antifogging property 1 hr | ◎ | ◎ | ◎ | X |
| 8 hrs | ◎ | ◎ | ◎ | X |
| Adhesion property | X | ○ | ○ | ○ |
| Water resistance | ○ | ○ | ○ | X |
| Running water pollution | ○ | X | X | ○ |

AC: transparent acrylic resin plate
PC: transparent polycarbonate resin plate
GL: transparent glass plate The coating film property test conditions and the evaluation methods in the tables 3 and 4 are as follows.

Breath antifogging property: Breath was blown thereto in an ordinary temperature, and existence or absence of fogging was evaluated by visual observation. Those without fogging were evaluated to be ○, and those with fogging were evaluated to be ×.

Steam fogging property: 40° C. steam was continuously directed to the coating films, and existence or absence of fogging was evaluated by visual observation after 1 hour and 8 hours. Those with a smooth water film formed without fogging were evaluated to be ◎, those without fogging but with a rugged water film without smoothness were evaluated to be ○, and those with fogging were evaluated to be ×.

Adhesion property: Based on the JIS K 5400 8.5.1, existence or absence of peel off of the coating film was evaluated by visual observation. Those without peel off at all were evaluated to be ○, and those with peel off were evaluated to be ×.

Water resistance: The external appearance of the coated plate after soaking in 40° C. warm water for 1 hour and drying at room temperature for 1 hour was evaluated by visual observation. Those with the same external appearance as the initial coating film state without change were evaluated to be ○, and those with opaqueness or dissolution of the coating film were evaluated to be ×.

Running water pollution: With the test plate disposed with inclination of about 45°, several drops of distilled water was dropped onto the coating film from above the test plate, and the test plate was charged immediately into a drier at 60° C. so as to be dried for 10 minutes. The external appearance of the test plate after the drying operation was evaluated by visual observation. Those without the running water trace at all were evaluated to be ○, and those with the trace as conspicuous pollution were evaluated to be ×.

As shown in the tables 3 and 4, according to the examples 6 to 10 using the antifogging paint compositions of the examples 1 to 5, they can be hardened even at a low temperature of about 75° C. and in relatively short time. They have an excellent antifogging property, adhesion property and water resistance. Furthermore, they have no pollution generation by the running water.

According to the example 9, due to the small ratio of the nitrogen atom containing vinyl monomer in the hydrophilic polymer part of the block or grafted copolymer, the steam antifogging property was slightly lowered. According to the example 10, due to absence of the surfactant, the steam antifogging property was slightly lowered.

In the case where a copolymer other than the block or grafted copolymer was used as in the comparative example 5, the adhesion property with respect to the base material was extremely poor. In the case where an acidic hardening catalyst other than the alkyl phosphate was used as in the comparative examples 6 and 7, although the excellent hardening property, the antifogging property at a low temperature and in a short time, and the water resistance are excellent, it is not preferable in terms of pollution generation by the running water. According to the comparative example 8, since trialkyl phosphate other than the monoalkyl phosphate or the dialkyl phosphate was used as the alkyl phosphate, the water resistance of the coating film was extremely poor, and dissolution of the coating film by the steam radiation was observed. Moreover, the hardening property at a low temperature and in a short was not preferable either.

Although the mechanism of pollution generation by the running water is not shown clearly, it is considered that in the case the acidic hardening catalyst is an organic sulfonic acid, itself can easily be dissolved in water so as to be eluted by the running water, precipitated as crystals after drying and remains as the pollution. Furthermore, since the organic sulfonic acid has a high activity as an acid, it changes the surfactant chemically so that the denatured surfactant can be the substance causing the pollution. In contrast, it is assumed that since an acidic alkyl phosphate having a weaker activity as an acid than the organic sulfonic acid can hardly denature the surfactant, it can hardly generate the running water pollution.

Furthermore, block copolymers with different compositions, grafted copolymers, or a block copolymer and a grafted copolymer can be used in a combination.

The invention claimed is:

1. An antifogging paint composition comprising:
   a block copolymer containing a hydrophilic polymer part formed from a water-soluble vinyl monomer and a cross-linkable vinyl monomer having a cross-linking functional group, and a hydrophobic polymer part formed from a non water-soluble vinyl monomer, wherein the weight ratio of the water-soluble vinyl monomer and the cross-linkable vinyl monomer is 70:30 to 99:1, and wherein the ratio of the hydrophilic polymer part in the copolymer is 50 to 95% by weight, wherein the copolymer is a block copolymer in which the water-soluble vinyl monomer is N,N-dimethyl acrylic amide, the cross-linkable vinyl monomer is N-methylol acrylic amide, and the non water-soluble vinyl monomer is methyl methacrylate; and
   an acidic alkyl phosphate having an alkyl group having 1 to 8 carbon atoms, wherein the content of the acidic alkyl phosphate is 0.01 to 3% by weight with respect to the copolymer.

2. The antifogging paint composition according to claim 1, further comprising a surfactant.

3. The antifogging paint composition according to claim 1, wherein the acidic alkyl phosphate contains at least one of a monoalkyl phosphate and a dialkyl phosphate.

4. The antifogging paint composition according to claim 3, wherein the acidic alkyl phosphate is a mixture of the monoalkyl phosphate and the dialkyl phosphate.

5. The antifogging paint composition according to claim 2, wherein the surfactant is a nonionic surfactant, an anionic surfactant, or a cationic surfactant.

6. The antifogging paint composition according to claim 2, wherein the surfactant is an anionic surfactant.

7. The antifogging paint composition according to claim 2, wherein the surfactant is an anionic surfactant and a nonionic surfactant.

8. An antifogging paint composition comprising:
   a block copolymer containing a hydrophilic polymer part formed from a water-soluble vinyl monomer and a cross-linkable vinyl monomer having a cross-linking functional group, and a hydrophobic polymer part formed from a non water-soluble vinyl monomer, wherein the weight ratio of the water-soluble vinyl monomer and the cross-linkable vinyl monomer is 70:30 to 99:1, and wherein the ratio of the hydrophilic polymer part in the copolymer is 50 to 95% by weight; and
   an acidic alkyl phosphate having an alkyl group having 1 to 8 carbon atoms, wherein the content of the acidic alkyl phosphate is 0.01 to 3% by weight with respect to the copolymer wherein the copolymer is a block copolymer in which the water-soluble vinyl monomer is methoxy diethylene glycol methacrylate, the cross-linkable vinyl monomer is a mixture of N-methylol acrylic amide, 2-hydroxy ethyl methacrylate and methyl methacrylate, and the non water-soluble vinyl monomer is methyl methacrylate.

9. A coating substance having a surface coated by an antifogging coating film of an antifogging paint composition, wherein the antifogging paint composition contains:
   a block copolymer containing a hydrophilic polymer part formed from a water-soluble vinyl monomer and a cross-linkable vinyl monomer having a cross-linking functional group, and a hydrophobic polymer part formed from a non water-soluble vinyl monomer, where in the weight ratio of the water-soluble vinyl monomer and the cross-linkable vinyl monomer is 70:30 to 99:1, and wherein the ratio of the hydrophilic polymer part in the copolymer is 50 to 95% by weight, wherein the copolymer is a block copolymer in which the water-soluble vinyl monomer is N,N-dimethyl acrylic amide, the cross-linkable vinyl monomer is N-methylol acrylic amide, and the non water-soluble vinyl monomer is methyl methacrylate; and
   an acidic alkyl phosphate having an alkyl group having 1 to 8 carbon atoms, wherein the content of the acidic alkyl phosphate is 0.01 to 3% by weight with respect to the copolymer.

10. A method for forming an antifogging coating film on a surface, comprising the steps of:
    preparing an antifogging paint composition containing a block copolymer comprising a hydrophilic polymer part formed from a cross-linkable vinyl monomer having a cross-linking functional group and a water-soluble vinyl monomer and a hydrophobic polymer part formed from a non water-soluble vinyl monomer, wherein the weight ratio of the water-soluble vinyl monomer and the cross-linkable vinyl monomer is 70:30 to 99:1, and wherein the ratio of the hydrophilic polymer part in the copolymer is 50 to 95% by weight; and an acidic alkyl phosphate having an alkyl group having 1 to 8 carbon atoms, wherein the content of the acidic alkyl phosphate is 0.01 to 3% by weight with respect to the copolymer, wherein the copolymer is a block copolymer in which the water-soluble vinyl monomer is N,N-dimethyl acrylic amide, the cross-linkable vinyl monomer is N-methylol acrylic amide, and the non water-soluble vinyl monomer is methyl methacrylate;
    forming a coating film by coating the antifogging paint composition on the surface;
    drying the coating film; and
    hardening the coating film.

11. The method according to claim 10, wherein the hardening step includes a step of heating at 75 to 130° C. for 5 to 20 minutes.

* * * * *